June 30, 1925.  
P. E. MORAN  
ELEVATOR DUMP STRUCTURE  
Filed June 6, 1924

Witness  
Inventor  
Peter E. Moran  
by Bair & Freeman Attys.

Patented June 30, 1925.

1,544,264

UNITED STATES PATENT OFFICE.

PETER E. MORAN, OF WOODWARD, IOWA.

ELEVATOR DUMP STRUCTURE.

Application filed June 6, 1924. Serial No. 718,323.

*To all whom it may concern:*

Be it known that I, PETER E. MORAN, a citizen of the United States, residing at Woodward, in the county of Dallas and State of Iowa, have invented a certain new and useful Elevator Dump Structure, of which the following is a specification.

The object of my invention is to provide an elevator dump structure wherein an auxiliary floor door is moved to position below the rear end of the wagon or truck before the contents thereof is dumped therefrom, the parts being simple, durable and comparatively inexpensive in construction.

More particularly, my invention relates to an auxiliary floor door operating device, operable upon the movement of the dump structure from one position to its dumping position for thereby raising the auxiliary floor door.

Still a further object is to so mount the floor door operating device upon the dump floor structure itself, so that the floor door may be moved toward closed position in case the rear end of the wagon or truck strikes thereagainst, when it is moved to dumping position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
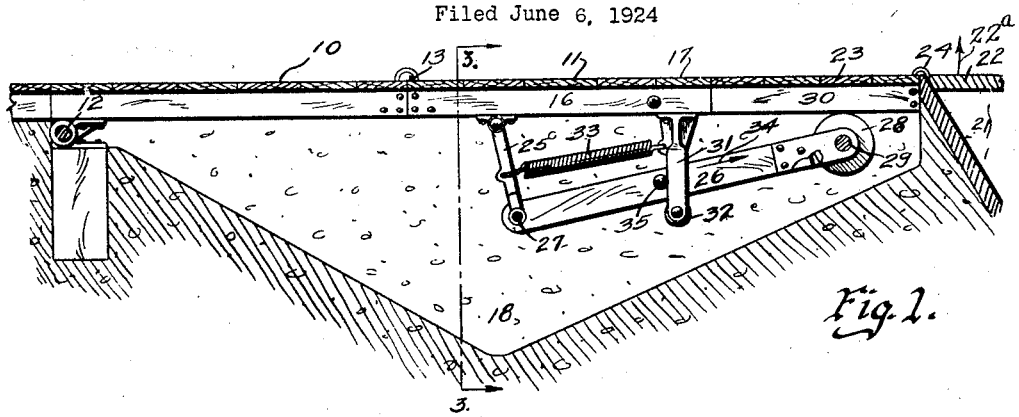
Figure 1 is a sectional view taken through an ordinary dump structure used in grain elevators, with my improved floor door operating device attached to one of the dump floor members.

In the accompanying drawings, I have used the reference numerals 10 and 11 to indicate the two floor dump members of an ordinary dump structure. The dump floor 10 is hingedly supported by means of the hinge 12. The two dump members 10 and 11 are connected together by a hinge 13.

The free end of the dump 11 has a pair of rollers 14 secured thereto, which ride in tracks or grooves 15.

The dump members 10 and 11 have a number of supporting beams 16 upon which rest the floor boards 17. The dump members 10 and 11 are capable of movement to position where the hinge 13 will be moved downwardly within the pit 18, and the parts assume the position shown in solid lines in Figure 2 of the drawings.

The dump members 10 and 11 are raised or lowered by any suitable means.

The parts just described, are of the ordinary construction and form no part of my present invention except that my floor door operating device cooperates with the parts just described.

Figure 2:
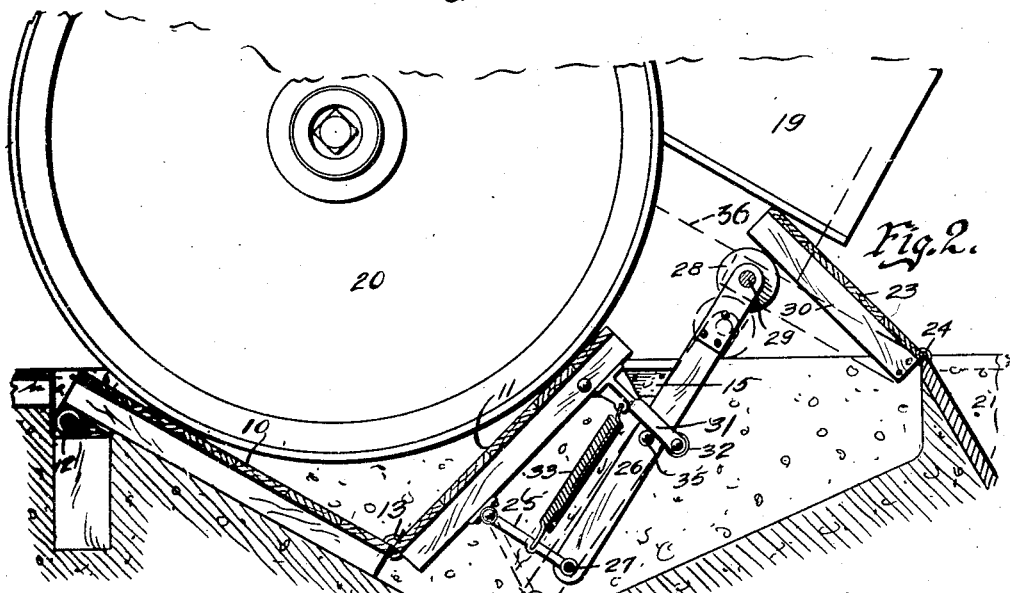
Figure 2 is a similar, sectional view with parts shown in position where a wagon or truck is being dumped, the dotted lines showing the floor door operating device in position it will assume as the rear end of the wagon or truck strikes thereagainst.
Figure 3:
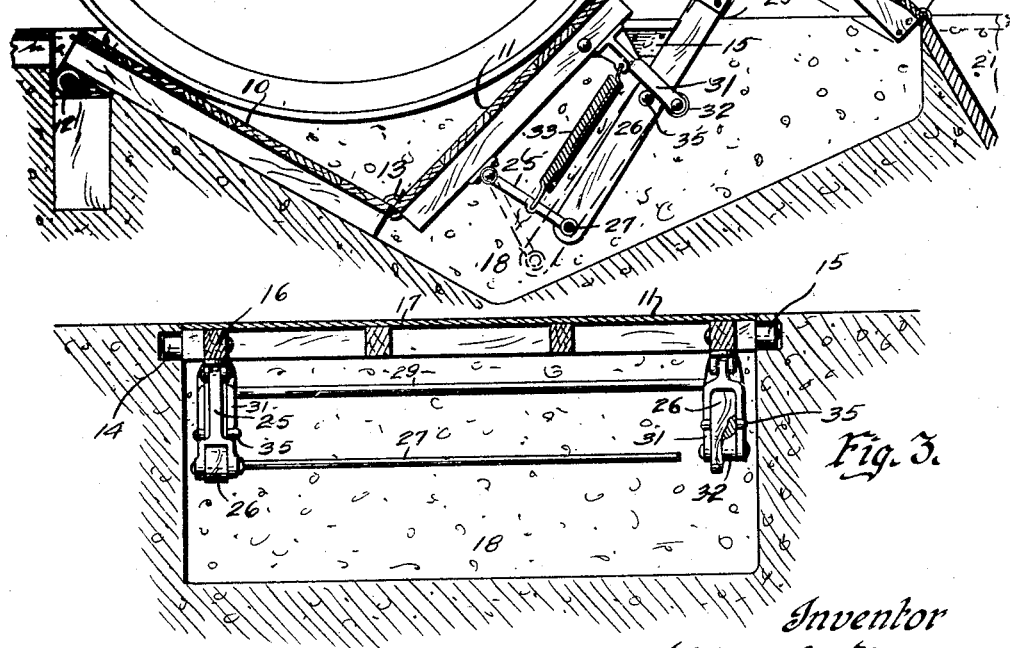
Figure 3 is a sectional view taken on line 3—3 of Figure 1, parts being broken away to better illustrate the construction.

A truck 19, having wheels 20, is shown in dumping position in Figure 2 of the drawings.

The grain passing from the truck 19 will pass into a chute or bin 21. The bin 21 is covered with a door member 22 which can be moved to inclined position, or to horizontal position where it will serve as a floor when the trucks pass thereover as shown in Figure 1. The door 22 is hinged (not shown in the drawing) and is swung upwardly in the direction of the arrow 22$^a$ while dumping the truck.

In a great many cases, when the truck is about to be dumped, quite a bit of grain will drop on to the floor between the dump members 10 and 11, and the chute or bin just rearwardly of the truck, and my floor door operating device is designed to raise a small portion of the floor below the rear end of the truck or wagon, which serves as a chute for causing all of the grain to pass into the bin or hopper provided for the purpose.

I have referred to the portion of the floor between the hopper or bin 21, and floor dumping member 11, by the reference numeral 23.

The floor 23 may properly be called a floor door, and is hingedly mounted by means of a hinge 24.

My floor door operating device consists of a pair of pivoted links 25 supported from the under side of the floor dump 11 on the beams 16.

Secured to each of the lower ends of the links 25 is a door operating rod or bar 26. The bars 26 and links 25 are connected together by means of a transverse shaft 27. The shaft 27 extends from one of the links 25 to the other of the links 25 so that the two sides of the door operating device may operate in unison.

Secured to the forward ends of the bars 26 are the rollers 28 mounted on a transverse shaft 29, which also extends from one side of the device to the other for retaining the ends of the bars 26 in proper position, and for permitting them to operate together.

The rollers 28 ride against two beams 30 mounted on the underside of the floor door 23.

In order to retain the bars 26 in proper position, I provide guide brackets 31, which are secured to the beams 16, and have the bars 26 pass therebetween.

A roller 32 on the bottom end of each of the guide brackets 31 retains the bars 26 in the guide brackets 31 and helps their easy passing therethrough.

A coil spring 33 is fixed to each of the links 25 and have their free ends connected to the guide brackets 31.

The coil springs 33 cause the bars 26 to be moved in the direction indicated by the arrow 34, for insuring the rollers 28 to engage the underside of the beams 30.

Stop pins 35 are mounted on the bars 26 and limit the amount of movement of the bars 26 in the direction indicated by the arrow 34.

The bars 26, however, may be moved in the direction opposite from the arrow 34, against the action of the springs 33, as will hereinafter be more fully set forth.

*Practical operation.*

In the practical operation of my invention, after a truck has been positioned with the rear wheels 20 upon the dump floors 10 and 11, the dump floors 10 and 11 are moved to the position shown in Figure 2 of the drawings, which will cause the rear end of the truck to be lowered so that the bottom thereof is in inclined position.

The door 22 is moved to open position so that the grain discharged from the truck will pass into the hopper 21.

As the dump floor 11 is moved from position shown in Figure 1 of the drawings, to position shown in Figure 2 of the drawings, it will carry with it the door operating device and the rollers 28 will ride against the beams 30, causing the door 23 to be swung on its hinge to the position shown in solid lines in Figure 2.

The springs 33 are strong enough to overcome the weight of the door 23.

When the floor dump members 10 and 11 are returned to normal position, then the bars 26 will be carried therewith, for permitting the door 23 to drop by gravity to its original or closed position.

In case the wagon or truck 19 is of such a kind that the box thereof would move to position shown in dotted lines 36, then the floor door 23 would not be permitted to raise the full distance, and the springs 33 would become extended, and the floor door as well as the operating device therefor, would assume the position shown in dotted lines in Figure 2 of the drawings.

When the wagon or truck is removed from the dump structure, the springs 33 would cause the bars to assume their normal position, and when the dump floors 10 and 11 are returned to normal position, as shown in Figure 1, the door 23 would be permitted to drop to its closed or normal position.

The door 23 serves as a chute between the rear end of the wagon or truck and the forward end of the hopper or bin 21, and insures all of the grain from passing into the bin or hopper.

It may be here mentioned that in a great many cases, where the end of the wagon or truck is short, the grain ordinarily falls on to the floor and is just as likely to pass into the dump pit 18 as into the proper bin 21.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. In combination with a wagon dump having hinged floor members, a floor door operating device hingedly connected to one of the floor members, a hinged floor door, means for retaining said device in engagement with the floor door whereby the movement of the floor members will raise said floor door.

2. In combination with a wagon dump having hinged floor members, a floor door, a hinged floor door operating device comprising a link pivotally connected to the floor member, a bar connected to said link in engagement with the floor door, a spring for retaining said bar in engagement with the floor door, the parts being so arranged that the floor door will be raised upon the operation of the floor members.

3. In combination with a wagon dump structure, a floor door operating device comprising a hinged floor door, means carried by said dump structure in engagement with said floor door, said last means operating to raise the floor door upon operation of said wagon dump.

4. In combination with a wagon dump structure, a floor door operating device comprising a hinged floor door, means carried by said dump structure in engagement with said floor door, said last means operating to raise the floor door upon operation of said wagon dump and means for permitting said last means to move independently of the dump structure from open to closed position.

Des Moines, Iowa, May 9, 1924.

PETER E. MORAN.